Patented Feb. 13, 1951

2,541,400

UNITED STATES PATENT OFFICE 2,541,400

N,N'-ALKYLENECYANINE DYES

Leslie G. S. Brooker and Robert H. Sprague, Rochester, N. Y., assignors to Eastman Kodak Company, Rochester, N. Y., a corporation of New Jersey No Drawing. Original application November 11, 1944, Serial No. 563,086. Divided and this application February 17, 1949, Serial No. 77,055

11 Claims. (Cl. 260—240.7)

This invention relates to N,N'-alkylenecyanine dyes and to a process for the preparation thereof.

It is known that N,N'-methylene- and N,N'-ethylene cyanine dyes can be prepared by condensing di-2-quinolylmethane with methylene iodide or ethylene bromide, and treating the resulting condensation produce with pyridine or alkali [Scheibe and Fischer, Ber. 59, 502 (1926)].

We have now found that these known 2,2'-cyanine dyes, as well as heretofore unknown N,N'-alkylenecyanine dyes which are not obtainable by the method of Scheibe and Fischer, can be prepared by condensing a di-2-quinolylmethane, a di-2-benzothiazolylmethane, a di-2-benzoxazolylmethane or other bis heterocyclic base derivatives of methane with an alkylene arylsulfonate. Our new process gives higher yields than the process of Scheibe and Fischer (in some cases very much higher), in addition to providing a means for obtaining N,N'-alkylenecyanine dyes which could not be obtained by the prior process.

It is, accordingly, an object of our invention to provide new N,N'-alkylenecyanine dyes. A further object is to provide a process for the preparation of such dyes. Other objects will appear hereinafter.

The N,N'-alkylenecyanine dyes can be prepared, in accordance with our invention, by reacting with an alkylene salt of the following general formula:

$$X-(CH_2)_n-X'$$

wherein $n$ represents a positive integer of from 2 to 3, and X and X' each represents an aryl sulfonate radical, upon a heterocyclic base derivative of methane of the following general formula:

wherein Z and Z' each represents the non-metallic atoms necessary to complete a heterocyclic nucleus containing from 5 to 6 atoms in the heterocyclic ring, followed by reacting upon the resulting hydro salt with an acid-binding agent. The process can be illustrated schematically for the preparation of 3,3'-ethylenethiacyanine p-toluenesulfonate as follows:

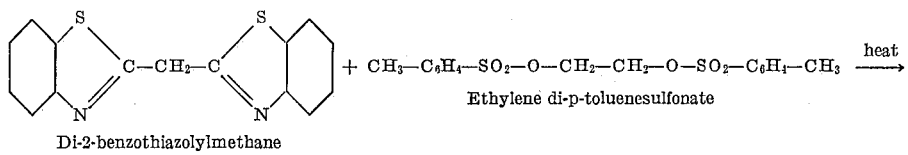

Di-2-benzothiazolylmethane     Ethylene di-p-toluenesulfonate

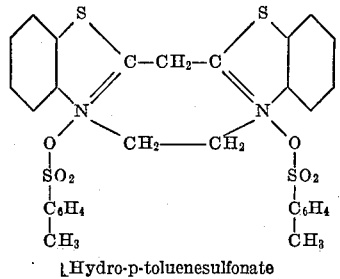

Hydro-p-toluenesulfonate

↓ Acid-binding agent e. g. $(C_2H_5)_3N$

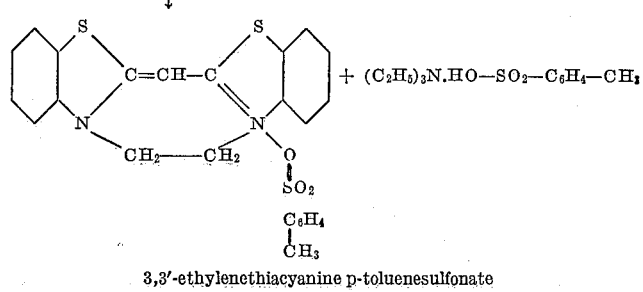

3,3'-ethylenethiacyanine p-toluenesulfonate

The cyanine arylsulfonates are advantageously converted to the more insoluble cyanine iodides to facilitate isolation from the reaction mixture, by treatment with sodium or potassium iodide. The cyanine bromides and perchlorates can be similarly obtained.

The heterocyclic base derivative of methane is advantageously heated with the alkylene aryl sulfonate at from 150 to 200° C., although higher or lower temperatures can be used. The acid-binding agent employed to convert the hydrosalt to the N,N'-alkylene cyanine salt is advantageously a strong organic base, such as a trialkylamine, a dialkylamine, a N-alkylpiperidine, etc., although sodium carbonate, ammonia or other acid-binding agents can be used. As alkylene arylsulfonates, alkylene p-toluenesulfonates are advantageously employed, although alkylene benzenesulfonates and other alkylene arylsulfonates can be employed.

The following examples will serve to illustrate our new dyes and the manner of obtaining them.

*Example 1.—3,3'-ethylenethiacyanine iodide*

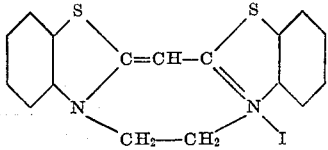

8.4 g. (1 mol.) of di-2-benzothiazolylmethane and 11.1 g. (1 mol.) of ethylene di-p-toluenesulfonate were heated together for 5 hours, at 170° C. The resulting solid yellow product was cooled and crushed under 25 cc. of acetone. The crushed yellow product was filtered off with suction and washed on the filter with acetone. The hydro-p-toluenesulfonate thus obtained was suspended in 50 cc. of hot methyl alcohol and an excess of triethylamine was added to the suspension. The yellow solid dissolved at once, giving a clear yellow solution. An excess of sodium iodide, dissolved in 20 cc. of hot methyl alcohol, was added to the yellow solution to convert the 3,3'-ethylenecyanine p-toluenesulfonate to the more insoluble 3,3'-ethylenecyanine iodide. The resulting mixture was chilled to 0° C., filtered with suction, and the cyanine iodide washed on the filter with methyl alcohol and with water. The yield of yellow crystals of 3,3'-ethylenethiacyanine iodide was 6 g. (46%). After recrystallization from methyl alcohol (140 cc. per gram of cyanine iodide), the product melted above 330° C. The yield after recrystallization was 38%.

*Example 2.—1,1'-ethylene-2,2'-cyanine iodide*

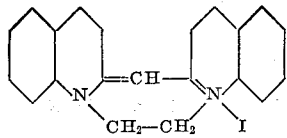

5.4 g. (1 mol.) of di-2-quinolylmethane and 7.4 g. (1 mol.) of ethylene di-p-toluenesulfonate were heated together at 160° C. for 16 hours. The viscous red product was cooled, washed by decantation with two 25 cc. portions of acetone, and the residue dissolved in 30 cc. of hot methyl alcohol. To the resulting solution of the hydro-p-toluenesulfonate of the dye was added an excess of triethylamine. To the resulting mixture was then added an excess of sodium iodide dissolved in 20 cc. of hot methyl alcohol to convert the 1,1'-ethylene-2,2'-cyanine p-toluenesulfonate to the more insoluble 1,1'-ethylene-2,2'-cyanine iodide. The resulting mixture was chilled to 0° C., and the cyanine iodide filtered off with suction. It was washed on the filter with acetone and water and dried in the air. The yield of minute green crystals was 1.4 g. (16%). After recrystallization from methyl alcohol (30 cc. per gram of crystals), the cyanine iodide was obtained as red needles, having a green reflex and melting above 330° C. The recrystallized yield was 5 per cent.

*Example 3.—3,3'-ethyleneoxacyanine iodide*

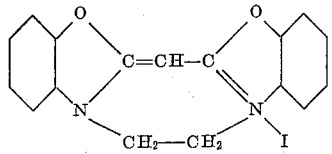

2.6 g. (1 mol.) of di-2-benzoxazolylmethane and 3.7 g. (1 mol.) of ethylene di-p-toluenesulfonate were heated together at 230° C. for 10 minutes. The resulting viscous greenish product was cooled, washed by decantation with 15 cc. of acetone and dissolved in 20 cc. of hot methyl alcohol. To the resulting solution containing the hydro-p-toluenesulfonate were added 2 cc. of triethylamine. The 3,3'-ethyleneoxacyanine p-toluenesulfonate was converted to the more insoluble 3,3'-ethyleneoxacyanine iodide by adding to the mixture an excess of sodium iodide dissolved in hot methyl alcohol. The mixture was then chilled to 0° C., the cyanine iodide filtered off with suction, washed on the filter with water and then with acetone. After recrystallization from methyl alcohol, the product consisted of a mixture of pale yellow needles and colorless crystals. The colorless material was removed by extraction with three 25 cc. portions of acetone. The remaining yellow crystals were then recrystallized from methyl alcohol (100 cc. per gram of crystals). The recrystallized yield was 0.3 g. (8%). The cyanine iodide melted above 325° C.

In a manner similar to that illustrated in the foregoing examples other N,N'-alkylenecyanine dyes can be prepared from heterocyclic base derivatives of methane, e. g. di-2-benzoselenazolylmethane, di-2-(4-methyl-thiazolyl)-methane, di-2-(4-phenylthiazolyl)-methane, di-2-(5-methylbenzoxazolyl)-methane, 2-benzothiazolyl-2-quinolylmethane or 2-benzoxazolyl-2-benzothiazolylmethane. Di-2-quinolylmethane is described by Scheibe and Fischer, supra. Di-2-benzothiazolylmethane can be prepared by condensing o-aminophenyl mercaptan with ethylmalonate according to the method of Mills, J. Chem. Soc. 121, 455 (1922). Di-2-benzoxazolylmethane and di-2-benzoselenazolylmethane can also be prepared according to the method of Mills, using o-aminophenol or o-aminoselenophenol instead of o-aminophenyl mercaptan. Di-2-(4-methylthiazolyl)-methane and di-2-(4-phenylthiazolyl)-methane can be prepared as described by H. Lehr et al., Helv. chim. Acta 27, 970 (1944). Di-2-(5-methylbenzoxazolyl)-methane and 2-benzoxazolyl-2-benzothiazolyl-methane are described in United States Patent 2,323,503, dated July 6, 1943, and any of the heterocyclic base derivatives set forth in that patent can be employed in practicing our invention. The following example shows the preparation of di-2-benzoxazolylmethane.

*Example 4.—Di-2-benzoxazolylmethane*

96.3 grams (2 mols.) of o-aminophenol and 71.0 grams (1 mol.) of ethyl malonate were boiled gently under reflux for 30 minutes. A stream of $CO_2$ gas was passed through the apparatus during the reaction and steam was passed through the condenser to facilitate the escape of the ethyl alcohol formed in the condensation. The reaction mixture was cooled and extracted with 1200 cc. hot ligroin and dried. The yield of pinkish crystals melting at 96 to 93° C. was 33.3 grams, 30 per cent.

2-benzothiazolyl-2-quinolylmethane can be prepared by condensing 2-chlorobenzothiazole with quinaldine. The following example illustrates the preparation:

*Example 4a.—2-benzothiazolyl-2-quinolylmethane*

85 g. (1 mol.) of 2-chlorobenzothiazole and 143 g. (2 mols.) of quinaldine were boiled together under reflux for 20 minutes. The resulting orange mixture was cooled, made alkaline with 40 per cent sodium hydroxide solution and excess quinaldine removed by steam distillation. The residue from the distillation was washed by decantation with water, and the sticky residue was extracted with 1600 cc. of hot ligroin. (An insoluble residue contains a tri-nuclear base, di-2-benzothiazolyl-2-quinolylmethane.) The ligroin solution was chilled to 0° C., the orange crystals filtered off with suction, washed on the filter with ligroin and dried. The yield was 33.0 g., 24 per cent. After recrystallization from ligroin, the product was obtained as orange crystals melting at 82° to 83° C. The yield of purified material was 19 per cent.

N,N'-alkylenecyanine dyes in which the alkylene group contains from 2 to 3 carbon atoms can also be prepared, we have found, by heating a N-bromoalkylcyanine base of the following general formula:

wherein n represents a positive integer of from 2 to 3, and Z and Z' each represents the non-metallic atoms necessary to complete a heterocyclic nucleous containing from 5 to 6 atoms in the heterocyclic ring. The process can be illustrated for 3,3'-ethylenethiacyanine bromide as follows:

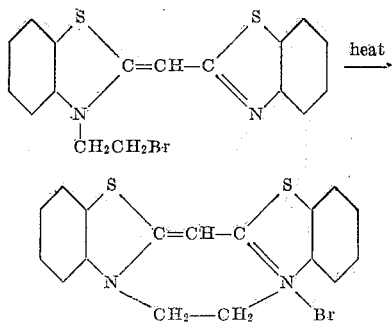

The heating is advantageously carried out at from 150° to 220° C. The resulting N,N'-alkylenecyanine bromide can be converted into the more insoluble iodide by treatment of an alcoholic solution thereof with an alcoholic solution of an alkali metal iodide. Using an alkali metal perchlorate, the N,N'-alkylene cyanine perchlorates can be obtained. The N,N'-alkylene cyanine bromides and iodides can be converted into the chlorides by treatment with silver chloride in a phenol according to the process described in United States Patent 2,245,249, dated June 10, 1941.

The starting N-bromoalkylcyanine base can be prepared by condensing a N-hydroxyalkylcyanine base with phosphorous tribromide. The N-hydroxyalkylcyanine bases can be obtained by condensing a cyclammonium β-hydroxyethyl-, or γ-hydroxypropyl quaternary salt containing a reactive methyl group in the α-position with a heterocyclic nitrogen base containing, in the α-position, a thioether group, e. g. an alkylthio group or an arylthio group, in the presence of an acid-binding agent, e. g. a tertiary organic amine, such as pyridine, a trialkylamine, or N-methylpiperidine, or an alkali metal carbonate, such as potassium or sodium carbonate. The starting cyanine base can also be prepared by reacting with ethylene bromohydrin or propylene-1,3-bromohydrin upon a base of the following formula:

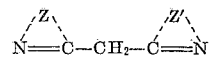

wherein Z and Z' each represents the non-metallic atoms necessary to complete a heterocyclic nucleus containing from 5 to 6 atoms in the heterocyclic ring, and then reacting upon the resulting hydrobromide with an acid-binding agent to split out the elements of hydrogen bromide. The acid-binding agent employed in this case is advantageously ammonia, although other organic bases, such as those given immediately above can also be employed, as can alkali metal carbonates.

Typical heterocyclic nuclei wherein Z and Z' in the above general formulas represent the non-metallic atoms necessary to complete a heterocyclic nucleus containing from 5 to 6 atoms in the heterocyclic ring include those selected from the group consisting of those of the thiazole series (e. g. thiazole, 4-methylthiazole, 5-methylthiazole, 4-phenylthiazole, 5-phenylthiazole, 4,5 - dimethylthiazole, 4,5 - diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7 - chlorobenzothiazole, 4-methylbenzothiazole, 5-methylbenzothiazole, 6-methylbenzothiazole, 5-bromobenzothiazole, 6-bromobenzothiazole, 4 - phenylbenzothiazole, 5-phenylbenzothiazole, 4 - methoxybenzothiazole, 5 - methoxybenzothiazole, 6 - methoxybenzothiazole, 5 - idobenzothiazole, 6-iodobenzothiazole, 4 - ethoxybenzothiazole, 5-ethoxybenzothiazole, tetrahydrobenzothiazole, 5,6 - dimethoxybenzothiazole, 5,6 - dioxymethylenebenzothiazole, 5-hydroxybenzothiazole, 6 - hydroxybenzothiazole, etc.), those of the naphthothiazole series (e. g. α-naphthothiazole, β-naphthothiazole, 5-methoxy - β - naphthothiazole, 5-ethoxy-β-naphthothiazole, 7 - methoxy - α - naphthothiazole, 8-methoxy-α-naphthothiazole, etc.), those of the thionaphtheno-7',6',4,5-thiazole series (e. g. 4'-methoxythionaphtheno - 7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-phenylbenzoxazole, 5 - methylbenzoxazole, 6-methylbenzoxazole, 5,6 - dimethylbenzoxazole, 4,6-dimethylbenzoxazole, 5-methoxybenzoxazole, 6-methoxybenzoxazole, 5-ethoxybenzoxazole, 6- chlorobenzoxazole, 5-hydroxybenzoxazole, 6-hydroxyzenboxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5 - chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), etc. Z', in addition, can represent the non-metallic atoms necessary to complete a heterocyclic nucleus selected from those of the 2-quinoline series (e. g. quinoline, 3-methylquinoline, 5 - methylquinoline, 7-methylquinoline, 8-methylquinoline, 6-chloroquinoline, 8 - chloroquinoline, 6 - methoxyquinoline, 6-ethoxyquinoline, 6 - hydroxyquinoline, 8 - hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine,, 3,3,5 - trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpridine, 2-hydroxypyridine, 3-hydroxypyridine, etc.), etc.

The following examples will serve to illustrate the manner of obtaining N,N'-alkylenecyanine dyes from N-bromoalkylcyanine dyes:

*Example 5.—3,3'-ethylenethiacyanine iodide*

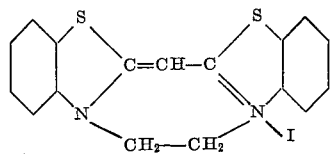

2 g. (1 mol.) of 2-(3-β-bromoethyl-2(3)-benzothiabolylidene )methylbenzothiazole were heated at 170° C. for 4 hours. The resulting yellow product (3,3'-ethylenethiacyanine bromide) was cooled and dissolved in 20 cc. of hot methyl alcohol. To the hot methyl alcohol solution was added a solution of sodium iodide in methyl alcohol to precipitate the 3,3'-ethylenethiacyanine as the iodide. The resulting mixture was chilled to 0° C., and the cyanine iodide filtered off with suction and washed on the filter with 10 cc. of acetone, followed by 10 cc. of water. The cyanine iodide was then dried in the air. 1.9 g. (85% yield) of the cyanine iodide was obtained as yellow crystals. After recrystallization from methyl alcohol (140 cc. per gram of cyanine iodide); the cyanine iodide melted above 330° C. The yield of recrystallized product was 1.4 g. (63%). The cyanine iodide gave a yellow solution in methyl alcohol, having a strong blue fluorescence.

The 2 - (3-β-bromoethyl-2(3)-benzothiazolylidene) methylbenzothiazole

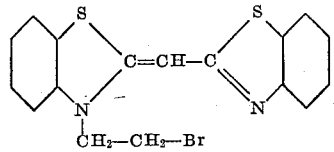

employed above, was prepared as follows:

3.9 g. (1 mol) of 2-(3-β-hydroxyethyl-2(3)-benzothiazolylidene) methylbenzothiazole and 10 cc. of phosphorus tribromide were heated together on a steam bath for one hour. A yellow solution formed which set to a solid mass of yellow crystals after 10 minutes heating. The reaction mass was cooled, broken up, and poured onto ice and made alkaline with 30 per cent ammonium hydroxide. The yellow crystals of the β-bromoethyl compound were then filtered off, washed on the filter with water, and dried in the air. The yield was 3.7 g. (79%), and the crystals melted initially at 85° to 90° C. As the temperature of the melting point bath was raised higher, the product resolidified and did not remelt at 320° C. The product appeared to rearrange upon attempted recrystallization from acetone giving a substance which melted above 320° C. Accordingly, the original air-dried product was used without further treatment.

The 2(3-β-hydroxyethyl-2(3)-benzothiazolylidene) methylbenzothiazole

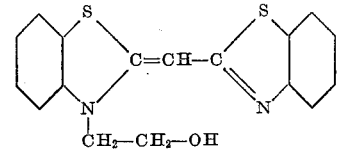

employed above was prepared as follows:

14.1 g. (1 mol.) of di-2-benzothiazolylmethane (prepared by the method of Mills, J. Chem. Soc. 121, 455, 1922) and 6.25 g. (1 mol.) of ethylene bromohydrin were heated together at 115° C. for 16 hours. The resulting yellow solid mass was crushed under 50 cc. of cold acetone, filtered with suction, washed on the filter with 25 cc. of acetone and dried in the air. The yield of yellow crystals was 19.8 g. (97%) which melted at 256° to 258° C. with decomposition. The bromide

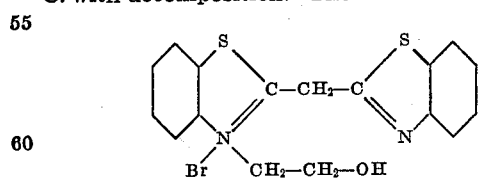

thus obtained was suspended in 50 cc. of methyl alcohol and the resulting suspension was made alkaline with 25 cc. of 30 per cent ammonium hydroxide. The solid bromide dissolved at once, giving a yellow solution from which the free base separated as yellow crystals upon stirring. The mixture was chilled at 0° C., filtered with suction, washed on the filter with 25 cc. of methyl alcohol and dried in the air. After recrystallization from methyl alcohol (100 cc. per gram of base), the base was obtained as yellow needles, melting with decomposition at 185° to 187° C. The yield was 11.9 g. (73%).

Example 6.—1′,3-ethylenethia-2′-cyanine iodide

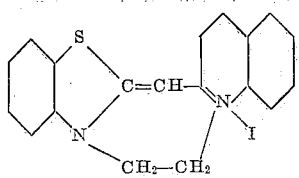

7.6 g. (1 mol.) of 2-(3-β-bromoethyl-2(3)-benzothiazolylidene)methylquinoline were heated at 170° C. for three hours. The red solid product was recrystallized several times from MeOH (200 cc. per gram). The yield of purified dye was 2.4 g., 28%. The dye melted at 320–25° C. with decomposition.

The 2-(3-β-bromoethyl-2(3)-benzothiazolylidene)-methylquinoline employed above was prepared as follows:

10.7 g. (1 mol.) of 2-(3-β-hydroxyethyl-2(3)-benzothiazolylidene)methylquinoline and 10 cc. of PBr$_3$ were boiled together under reflux for five minutes. The product was cooled, stirred with ice and water, filtered with suction and washed on the filter with water and acetone. The red crystals were then suspended in 50 cc. MeOH and the mixture made alkaline with Na$_2$CO$_3$. The sticky brown product was filtered off, washed with MeOH and recrystallized from MeOH (450 cc. per gram). The yield of purified product was 8.5 g., 67%. The product was obtained as orange needles melting at 147–8° C.

The 2-(3-β-hydroxyethyl-2(3)-benzothiazolylidene)-methylquinoline employed above was prepared as follows:

31.2 g. (1 mol.) of 2-methylbenzothiazole-β-hydroxy ethobromide and 25.0 g. (1 mol.+25% excess) of 2-methylmercaptoquinoline were boiled under reflux for fifteen minutes. The red solid product was cooled, washed by decantation with 200 cc. cold acetone and recrystallized from 3000 cc. MeOH. The yield of red crystals melting at 277–8° C. was 15.4 g., 34%. The hydrobromide thus obtained was then suspended in 100 cc. abs. EtOH and 5 cc. triethylamine added. The mixture was chilled, diluted with 1000 cc. of water and the free base filtered off. The yield of orange crystals which melted at 143–4° C. was 11.0 g., 30%.

In a manner similar to that illustrated in the foregoing Examples 5 and 6, 1′,3-ethyleneselena-2′-cyanine iodide, 3,3′-ethyleneselenathiacyanine iodide, 3,3′-propylenethiacyanine iodide and 3,3′-ethyleneselenacyanine iodide can be prepared.

Example 7.—3,3′-propylenethiacyanine bromide

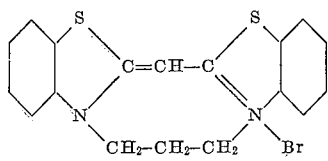

1.0 g. (1 mol.) of 2-(3-γ-bromopropyl-2(3)-benzothiazolylidene) methylbenzothiazole was heated strongly over a flame until the product solidified (about 30 seconds). The mixture was cooled, stirred with 15 cc. of acetone, chilled to 0° C. and filtered with suction. The yield of yellow crystals was 0.5 g. (50%). After recrystallization from methyl alcohol (100 cc./g. of dye), the product was obtained as a yellow powder melting with decomposition at 300° to 303° C. The yield of pure dye was 0.4 g. (40%). The dye was found to be a moderately strong sensitizer, extending the sensitivity of a gelatino-silver halide emulsion to 470 mμ with no definite maximum.

The 2-(3-γ-bromopropyl-2(3)-benzothiazolylidene)methylbenzothiazole employed above was prepared as follows:

1.5 g. (1 mol.) of 2-(3-γ-hydroxypropyl-2(3)-benzothiazolylidene)methylbenzothiazole and 5 cc. of PBr$_3$ were heated to boiling in a test tube. A yellow solid separated at once. The reaction mixture was cooled, made alkaline with cold dilute Na$_2$CO$_3$ solution, and the product filtered with suction, washed with water and dried. The yield of yellow crystals was 1.3 g. (73%). After recrystallization from MeOH (167 cc./g. of product), the product melted at 134°–136° C., resolidified as the temperature was raised further and melted again at 292°–293° C.

The 2-(3-γ-hydroxypropyl-2(3)-benzothiazolylidene)methylbenzothiazole employed above was prepared as follows:

5.0 g. (1 mol.) of di-2-benzothiazolylmethane and 2.5 g. (1 mol.) of trimethylenebromohydrin were heated together on a steam bath for 16 hours. The yellow solid product was crushed under 25 cc. of acetone, chilled to 0° C. and filtered with suction. The solid was washed on the filter with 10 cc. of fresh acetone and dried. The yield of yellow crystals was 2.6 g. (35%). The bromide was then suspended in 25 cc. of MeOH and made alkaline with NH$_4$OH while stirring. The yellow base was filtered off, washed on the filter with water and dried. The yield was 1.8 g. (31%) of product melting at 121°–122° C.

In a manner similar to that illustrated in the foregoing Examples 5, 6 and 7, 1′,3′-ethyleneselena-2′-cyanine iodide, 3,3′-ethyleneselenathiacyanine, 3,3′-propylenethiacyanine iodide and 3,3′-ethyleneselenacyanine iodide can be prepared.

The symmetrical N,N′-alkylenecyanine dyes, prepared from the bis-(heterocyclyl)methanes wherein Z and Z′ of the above general formula are identical, containing a simple thiazole nucleus (e. g. 4-methylthiazole, 4-phenylthiazole, etc.), a benzothiazole nucleus, a benzoxazole nucleus or a benzoselenazole nucleus are new. The unsymmetrical N,N′-alkylenecyanine dyes prepared from the bis(heterocyclyl)methanes wherein Z and Z′ of the above general formula are different from one another are also new.

The N,N′-alkylenecyanine dyes obtainable by our process sensitize photographic silver halide emulsions when incorporated therein. The following table shows the sensitizing action of the N,N′-alkylenecyanine dyes of Examples 1 to 6.

| Dye | Concentration | Emulsion | Sensitizing Action |
|---|---|---|---|
| Ex. 1 | 20 mg. 1 liter of emulsion | gelatino-silver-chlorobromide | extends to 490 mμ with max. at 465 mμ, weak. |
| Ex. 2 | do | gelatino-silver-bromiodide | extends to 570 mμ with max. at 565 mμ, strong. |
| Ex. 3 | do | gelatino-silver-chlorobromide | trace. |
| Ex. 5 | do | do | extends to 490 mμ with max. at 465 mμ, weak. |
| Ex. 6 | do | do | extends to 560 mμ with max. at 520 mμ, strong. |

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. Ethyl alcohol or acetone may also be employed where the solubility of the dyes in methanol is lower than desired.

Sensitization by means of our new dyes is, of course, directed primarily to the ordinarily employed gelatino - silver - halide developing - out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which includes most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

Our new dyes give rise to two extreme resonance configurations as do N,N'-dialkylcyanine dyes. For instance in the case of 1',3-ethylenethia-2'-cyanine iodide (Example 6, the extreme configurations can be represented as follows:

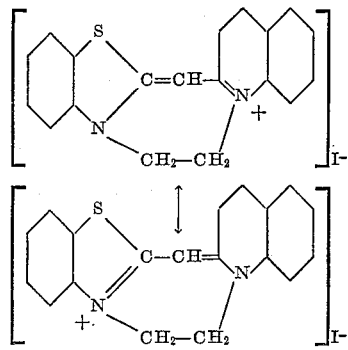

The term "simple thiazole" is employed herein to indicate a thiazole which does not contain a fused-on aryl nucleus. 4-Methylthiazole and 4-phenylthiazole are typical simple thiazoles. Benzothiazole, on the other hand, contains a fused-on benzene nucleus.

This application is a division of our application Serial No. 563,086, filed November 11, 1944, now U. S. Patent 2,478,367, dated August 9, 1949.

What we claim as our invention and desire secured by Letters Patent of the United States is:

1. A process for preparing a N,N'-alkylenecyanine dye comprising heating a N-bromoalkylcyanine base of the following general formula:

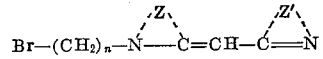

wherein $n$ represents a positive integer of from 2 to 3, and Z and Z' each represents the non-metallic atoms necessary to complete a heterocyclic nucleus selected from the group consisting of benzoxazole, benzothiazole, benzoselenazole and quinoline nuclei.

2. A process for preparing a symmetrical N,N'-alkylenecyanine dye comprising heating a N-bromoethylcyanine base of the following general formula:

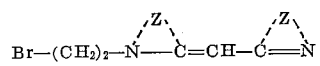

wherein Z represents the non-metallic atoms necessary to complete a heterocyclic nucleus of the benzothiazole series.

3. A process for preparing a symmetrical N,N'-alkylenecyanine dye comprising heating a N-bromoethylcyanine base of the following formula:

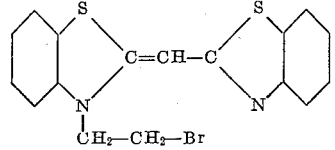

4. A process for preparing an asymmetrical N,N'-alkylenecyanine dye comprising heating a N-bromoethylcyanine base of the following general formula:

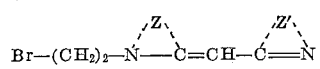

wherein Z represents the non-metallic atoms necessary to complete a heterocyclic nucleus of the benzothiazole series and Z' represents the non-metallic atoms necessary to complete a heterocyclic nucleus of the quinoline series.

5. A process for preparing an asymmetrical N,N'-alkylenecyanine dye comprising heating a N-bromoethylcyanine base of the formula:

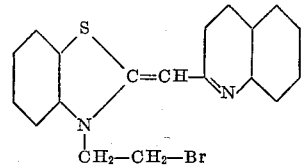

6. A process for preparing a symmetrical N,N'-alkylenecyanine dye comprising heating a N-bromopropylcyanine base of the following general formula:

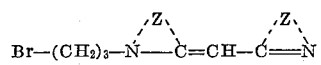

wherein Z represents the non-metallic atoms necessary to complete a heterocyclic nucleus of the benzothiazole series.

7. A process for preparing a symmetrical N,N'-alkylenecyanine dye comprising heating a N- bromopropylcyanine base of the following formula:

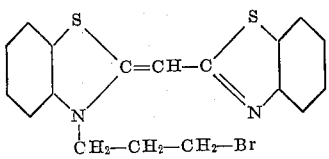

8. The asymmetrical N,N'-alkylenecyanine dyes of the following general formula:

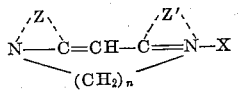

wherein $n$ represents a positive integer of from 2 to 3, X represents an anion, Z represents the non-metallic atoms necessary to complete a heterocyclic nucleus selected from the group consisting of benzothiazole, benzoxazole and benzoselenazole nuclei and Z' is different from Z and represents the non-metallic atoms necessary to complete a heterocyclic nucleus selected from the group consisting of benzothiazole, benzoxazole, benzoselenazole and quinoline nuclei.

9. The asymmetrical N,N'-alyklenecyanine dyes of the following general formula:

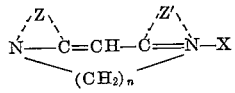

wherein X represents an anion, $n$ represents a positive integer of from 2 to 3, Z represents the non-metallic atoms necessary to complete a benzothiazole nucleus and Z' represents the non-metallic atoms necessary to complete a quinoline nucleus.

10. The asymmetrical N,N-alkylenecyanine dyes of the following formula:

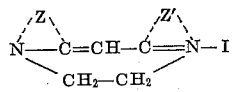

wherein Z represents the non-metallic atoms necessary to complete a benzothiazole nucleus and Z' represents the non-metallic atoms necessary to complete a quinoline nucleus.

11. The asymmetrical N,N'-alkylenecyanine dye of the following general formula:

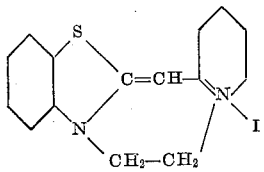

LESLIE G. S. BROOKER.
ROBERT H. SPRAGUE.

REFERENCES CITED

The following references are of record in the file of this patent:

UNITED STATES PATENTS

| Number | Name | Date |
| --- | --- | --- |
| 2,478,367 | Brooker | Aug. 9, 1949 |
| 2,479,152 | Brooker | Aug. 16, 1949 |

OTHER REFERENCES

Scheibe, Berichte, vol. 59, pp. 502–508, 1926.

Certificate of Correction

Patent No. 2,541,400                                                       February 13, 1951

LESLIE G. S. BROOKER ET AL.

It is hereby certified that error appears in the printed specification of the above numbered patent requiring correction as follows:

Column 4, line 8, for "30 cc." read *50 cc.*; column 8, line 34, for "2(3-β-hydroxyethyl" read *2-(3-β-hydroxyethyl*; column 10, line 10, for "colled" read *cooled*; column 14, line 12, strike out the word "general" and insert the same after "following" in line 2, same column;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*